UNITED STATES PATENT OFFICE.

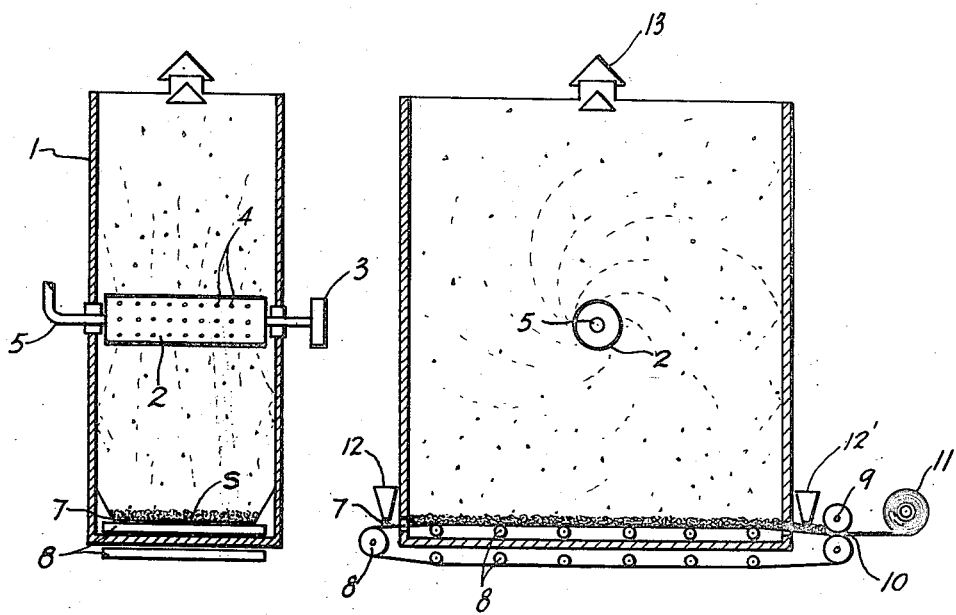

RAY P. PERRY, OF UPPER MONTCLAIR, NEW JERSEY, ASSIGNOR TO THE BARRETT COMPANY, A CORPORATION OF NEW JERSEY.

BODY OF BITUMINOUS MATERIAL AND METHOD OF PRODUCING THE SAME.

1,402,177. Specification of Letters Patent. Patented Jan. 3, 1922.

Application filed November 16, 1918. Serial No. 262,897.

*To all whom it may concern:*

Be it known that I, RAY P. PERRY, a citizen of the United States, residing at Upper Montclair, in the county of Essex and State of New Jersey, have invented certain new and useful Improvements in Bodies of Bituminous Material and Methods of Producing the Same, of which the following is a specification.

This invention relates to a process of preparing fusible bituminous material and the like, such as asphalt, pitch, resin, etc., in convenient form for purposes of shipment and use, and to the product obtained thereby.

The object of the invention is to prepare bituminous materials, which are sticky at ordinary temperatures, so that they may be easily and conveniently handled without entailing great expense for packages and labor of filling same.

In practicing this invention asphalt, for example, is comminuted so as to form small particles which are agglomerated into blocks of convenient size. The stickiness of the material will cause the individual particles to adhere and prevent the blocks from readily falling apart when once formed. The blocks may be maintained separate from each other after they have been formed by wrapping them in paper or by coating their surfaces with non-adherent material.

At the end of the usual process of making asphalt it is in a hot liquid condition, and instead of placing it in cooling tanks and then filling into steel or wooden packages, I take it in the hot liquid condition and comminute it in any convenient maner. Preferably it is conducted into a rapidly rotating basket having perforations in its periphery. The exact size and shape of the comminuted particles are generally immaterial, but can be varied when formed by means of a centrifugal machine by varying the temperature, speed, size of the perforations, and diameter of the basket. In practice it has been found that round particles varying from about the size which will pass through a hundred mesh screen up to those having a diameter of $\frac{1}{8}$ of an inch or more can be readily formed in large quantities. Other shapes and sizes may be used also.

After the material has been comminuted into the desired size, quantities of the particles maintained at a suitable temperature, generally about 60 to 150° F., may be gathered up and pressed in a mold or any other suitable device whereupon the mass will assume shapes dependent upon the particular mold or device that is used for shaping the same. Convenient shapes have been found to be cubical and rectangular blocks and flat sheets, though various other shapes may be made with satisfactory results, as will be obvious. The dimensions of the blocks, or other shapes, may be varied through very wide ranges. The slight pressure in the molds, or other shaping means, will cause the sticky particles to adhere to each other and retain the shape of the blocks that are formed. After the material has been fashioned into the desirable shapes, it may be covered with paper or wrapped in any convenient and cheap material so that the portions will not stick to each other when piled together. Instead of their being wrapped as indicated, they may be coated with non-adherent substances such as powdered soapstones or talc.

Instead of pressing the material in molds it is preferred to perform the process as will be more particularly described in connection with the accompanying drawings in which Fig. 1 is a vertical section through a device showing how the material may be conveniently shaped into a flat sheet;

Fig. 2 is a side view of the same.

In the drawings, 1 represents a housing preferably of sheet iron in which is located a horizontal hollow perforated centrifugal or whizzer 2 which is held in position by suitable bearings and may be rapidly rotated by motor 3. The perforations in the basket are represented by 4. A supply pipe 5 conducts the hot liquid asphalt from its source not shown into the interior of the centrifugal machine 2. When the material is fed to the rapidly revolving centrifugal 2 it is thrown out in a comminuted form, preferably as round, shot like bodies, in all directions, and falls by gravity to the bottom of the housing where it is received on a belt or other suitable conveyor 7 which is supported on rollers 8 and is driven in the direction indicated by the arrow, by any convenient means, not shown. A layer is allowed to accumulate on the conveyor 7 and by the motion of the belt this is carried through squeeze rolls 9 where the comminuted particles are compressed into a band or layer 10 which may be wound up in a roll 11, or it may be cut off in lengths as desired or may be folded back and forth on itself. If desired, powdered soapstone or other anti-sticking material may be spread on the conveyor 7 as it enters the housing 1 from the supply hopper 12, and also it may be spread on the comminuted material before compressing from supply hopper 12'. Vapors evolved in the housing may escape at vent 13.

The sheet 10 may be cut off when the roll 11 attains a suitable size, and a fresh roll started.

In the case of high melting point asphalt, especially the so-called blown asphalt, it may not be necessary to wrap the roll in paper as after this material cools and sets it does not soften and flow at ordinary temperatures in handling and storage. With softer grades of asphalt and with certain pitches it will be necessary to wrap the rolls in strong paper or other container may be used.

By the use of this process in preparing high melting point asphalts for shipment expensive containers or drum costing several dollars per ton of asphalt may be avoided. It is to be understood that the material may be formed into other shapes which come within the scope of the claims without departing from this invention, as this particular embodiment of the invention has been described for illustrative purposes.

Claims:

1. The herein described process of preparing bituminous material which comprises comminuating the material while in liquid form and later agglomerating the particles.

2. The herein described process of preparing bituminous material which comprises comminuting the material while in liquid form and later compressing the particles so that they stick together.

3. The herein described process of preparing bituminous material which comprises comminuting hot liquid asphalt and later agglomerating the particles.

4. The herein described process of preparing bituminous material which comprises comminuting the material by spraying it into a cooling fluid and later agglomerating the partly cooled particles.

5. The herein described process of preparing bituminous material which comprises comminuating the material by spraying it into a cooling fluid by centrifugal force and later agglomerating the partly cooled particles.

6. The herein described process of preparing bituminous material which comprises comminuting the material by spraying it into a cooling fluid, later agglomerating the partly cooled particles, collecting on a conveyor, and compressing the particles to form a layer.

7. The herein described process of preparing bituminous material which comprises comminuting the material by spraying it into a cooling fluid, later agglomerating the partly cooled particles. collecting on a conveyor, compressing the particles to form a layer, and forming in a roll.

8. As a new article of manufacture, a body of shot of asphalt compressed so as to stick together.

9. As a new article of manufacture, a sheet made of shot of asphalt wound into a roll.

10. As a new article of manufacture, a sheet made of shot of asphalt wound into a roll with anti-sticking material between convolutions.

In testimony whereof I affix my signature.

RAY P. PERRY.